United States Patent
Wu et al.

(10) Patent No.: US 10,402,562 B2
(45) Date of Patent: Sep. 3, 2019

(54) METHOD AND DEVICE FOR ENCRYPTING APPLICATION

(71) Applicant: Beijing Xiaomi Mobile Software Co., Ltd., Beijing (CN)

(72) Inventors: Liangxiong Wu, Beijing (CN); Haitao Liu, Beijing (CN); Guangjian Wang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 243 days.

(21) Appl. No.: 15/469,623

(22) Filed: Mar. 27, 2017

(65) Prior Publication Data
US 2017/0344741 A1 Nov. 30, 2017

Related U.S. Application Data

(63) Continuation of application No. PCT/CN2016/083335, filed on May 25, 2016.

(51) Int. Cl.
*G06F 21/31* (2013.01)
*G06F 21/54* (2013.01)
(Continued)

(52) U.S. Cl.
CPC .............. *G06F 21/54* (2013.01); *G06F 21/31* (2013.01); *G06F 21/62* (2013.01); *H04W 12/02* (2013.01); *G06F 21/52* (2013.01); *H04W 88/02* (2013.01)

(58) Field of Classification Search
CPC .......... G06F 21/54; G06F 21/62; G06F 21/31; G06F 21/52; H04W 12/02; H04W 88/02
See application file for complete search history.

(56) References Cited

U.S. PATENT DOCUMENTS 8,595,810 B1 11/2013 Ben Ayed
2007/0180492 A1* 8/2007 Hassan ................. G06F 21/629
726/2
(Continued)

FOREIGN PATENT DOCUMENTS

EP 2 637 123 A1 9/2013

OTHER PUBLICATIONS

Transactional Locking II Dave Dice1, Ori Shalev2, 1, and Nir Shavit1 (Year: 1997).*

(Continued)

*Primary Examiner* — Alexander Lagor
*Assistant Examiner* — Vu V Tran
(74) *Attorney, Agent, or Firm* — Finnegan, Henderson, Farabow, Garrett & Dunner LLP

(57) ABSTRACT

The present disclosure relates to a method and a device for encrypting an application, belonging to a field of computer technology. The method includes: receiving a foreground running request sent by the application, in which the foreground running request includes a system account ID of a system account logged in a system currently; detecting whether the system account ID is a main account ID of the system; replacing the system account ID with the main account ID of the system if the system account ID is not the main account ID of the system; and determining an encryption algorithm for the application in the system the main account logged in, and encrypting the application according to the encryption algorithm.

13 Claims, 5 Drawing Sheets

(51) Int. Cl.
*G06F 21/62* (2013.01)
*H04W 12/02* (2009.01)
*G06F 21/52* (2013.01)
*H04W 88/02* (2009.01)

(56) References Cited

U.S. PATENT DOCUMENTS

| | | | | |
|---|---|---|---|---|
| 2013/0238906 A1* | 9/2013 | Khoury | ............... | G06F 21/6218 713/193 |
| 2015/0347743 A1* | 12/2015 | Magee | .................... | G06F 21/44 726/21 |
| 2015/0373023 A1* | 12/2015 | Walker | .................... | H04L 63/10 726/3 |
| 2016/0124751 A1* | 5/2016 | Li | ....................... | G06F 9/45541 380/44 |
| 2016/0315920 A1* | 10/2016 | Kurmala | ............. | H04L 63/0471 |

OTHER PUBLICATIONS

Extended European Search Report dated Apr. 3, 2017, in counterpart European Application No. 16203032.4-1870.
Anonymous: "sudo-Wikipedia", May 19, 2016, XP055357607, retrieved from the Internet: URL:https://en.wikipedia.org/w/index.php!title=5udo&oldid=721111209, (retrieved on Mar. 22, 2017), 23 pages.
Anonymous: "sudo(8) Mac OS X Manual Page". Jul. 19, 2010 (Jul. 19, 2010), XP055358285, Retrieved from the Internet: URL: https://developer.apple.com/legacy/library/documentation/Darwin/Reference/ManPages/man8/sudo.8.html, (retrieved on Mar. 23, 2017), 7 pages.

\* cited by examiner

US 10,402,562 B2

METHOD AND DEVICE FOR ENCRYPTING APPLICATION

CROSS REFERENCE TO RELATED APPLICATION

This application is based on and claims a priority to International Patent Application No. PCT/CN2016/083335, filed on May 25, 2016, the entire contents of which are incorporated herein by reference.

TECHNICAL FIELD

The present disclosure relates to the field of computer technology, and more particularly to a method and a device for encrypting an application.

BACKGROUND

As information security catches more and more user's attention, usage of an application lock configured with a function for encrypting an application becomes increasingly popular.

At present, a plurality of system accounts may be set in a terminal. Each system account corresponds to one resource file. Each resource file is configured to store a resource needed to be called for running various applications installed in the system when the corresponding system account is logged in. As the plurality of system accounts include a main account and a plurality of child accounts, and the application lock can only read the resource file corresponding to the main account, the application lock may only encrypt the application installed in a system using the main account.

SUMMARY

According to a first aspect of embodiments of the present disclosure, a method for encrypting an application is provided. The method includes: receiving a foreground running request sent by the application, in which the foreground running request includes a system account ID of a system account logged in a system currently; detecting whether the system account ID is a main account ID of the system; replacing the system account ID with the main account ID of the system if the system account ID is not the main account ID of the system; and determining an encryption algorithm for the application in the system the main account logged in, and encrypting the application according to the encryption algorithm.

According to a second aspect of embodiments of the present disclosure, an apparatus for encrypting an application is provided. The apparatus includes: a processor and a memory configured to store instructions executable by the processor. The processor is configured to: receive a foreground running request sent by the application, in which the foreground running request includes a system account ID of a system account logged in a system currently; detect whether the system account ID is a main account ID of the system; replace the system account ID with the main account ID of the system if the system account ID is not the main account ID of the system; and determine an encryption algorithm for the application in the system the main account logged in, and encrypt the application according to the encryption algorithm.

According to a third aspect of embodiments of the present disclosure, there is provided a non-transitory computer-readable storage medium having stored therein instructions that, when executed by a processor of a terminal, causes the terminal to perform the method described in the first aspect.

It is to be understood that both the foregoing general description and the following detailed description are exemplary and explanatory only and are not restrictive of the disclosure.

BRIEF DESCRIPTION OF THE DRAWINGS

Accompanying drawings herein are incorporated in and constitute a part of the specification, and illustrate exemplary embodiments in line with the present disclosure, and serve to explain the principle of the present disclosure together with the description.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

Figure 1:
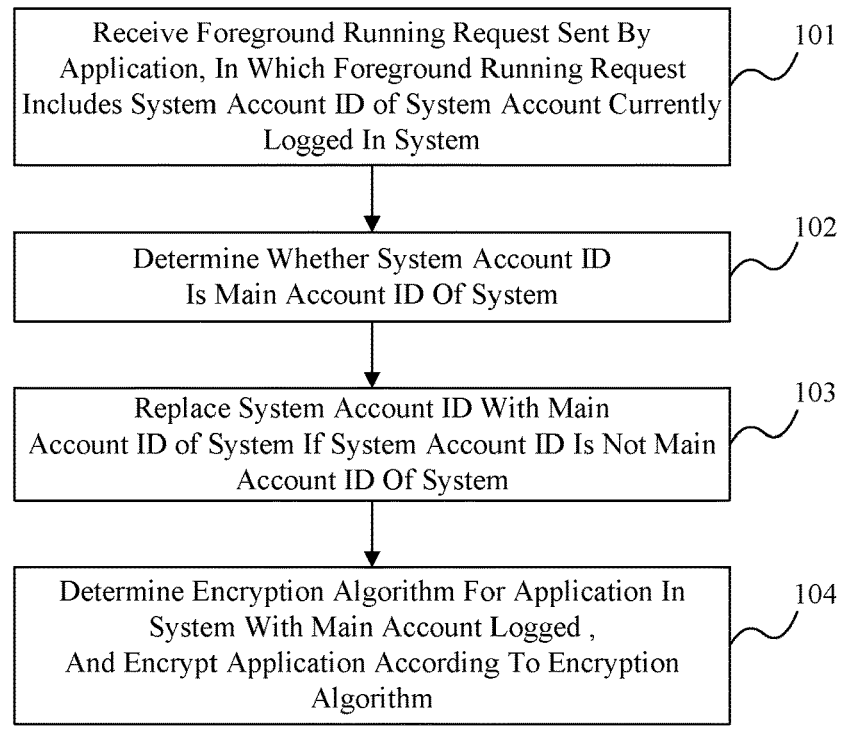
FIG. 1 illustrates a flow chart of a method for encrypting an application according to an exemplary embodiment.

FIG. 1 illustrates a flow chart of a method 100 for encrypting an application according to an exemplary embodiment. The method 100 is applied to a terminal, and a plurality of system accounts may be set in the terminal. As shown in FIG. 1, the method 100 includes the following steps.

In step 101, a foreground running request sent by the application is received, in which the foreground running request includes a system account ID of a system account currently logged in a system.

In step 102, it is determined whether the system account ID is a main account ID of the system.

In step 103, the system account ID is replaced with the main account ID of the system if the system account ID is not the main account ID of the system.

In step 104, an encryption algorithm for the application in the system with the main account logged in is determined, and the application is encrypted according to the encryption algorithm.

In conclusion, according to the method 100 provided by embodiments of the present disclosure, by replacing the system account ID included in the foreground running request sent by the application with the main account ID, an application lock in the terminal may encrypt the application according to the encryption algorithm for the application in the system with the main account logged in. In this manner, a problem that the application lock can only encrypt the application running in the system with the main account logged in, resulting in a narrow applying range of the application lock, may be solved. Thus, an effect of expanding the applying range of the application lock may be achieved.

Figure 2:
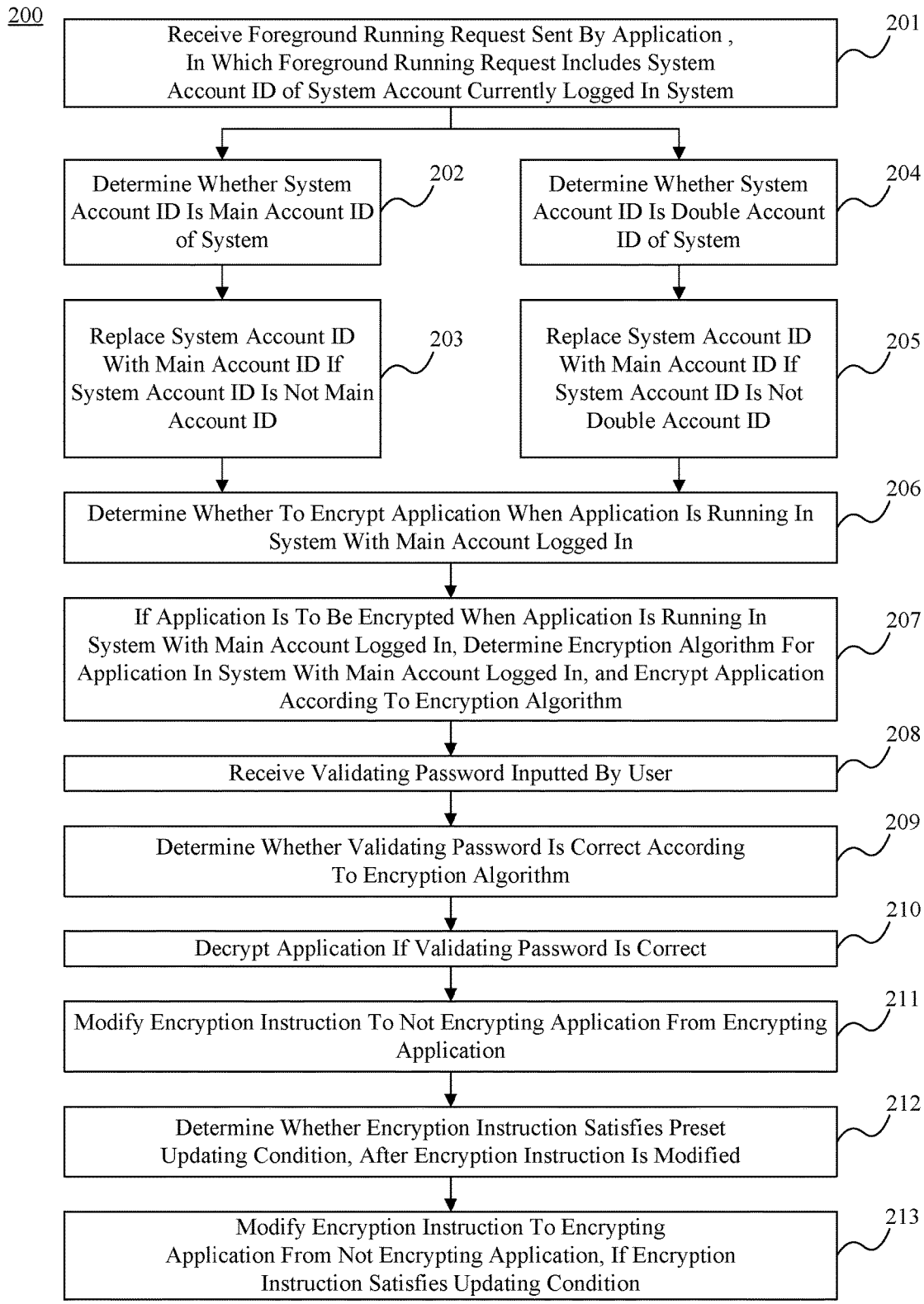
FIG. 2 illustrates a flow chart of a method for encrypting an application according to another exemplary embodiment.

FIG. 2 illustrates a flow chart of a method 200 for encrypting an application according to another exemplary embodiment. The method 200 is applied to a terminal, in which a plurality of system accounts may be set in the terminal. As shown in FIG. 2, the method 200 includes the following steps.

In step 201, a foreground running request sent by the application is received, in which the foreground running request includes a system account ID of a system account currently logged in a system.

When a user starts an application, the application may send the foreground running request to the terminal. The foreground running request is configured to request the terminal to run the application in the foreground. The foreground running request includes the system account ID of the system account currently logged in the system. The system account ID of the system account currently logged in the system indicates an ID of the system account corresponding to a resource file used when the application is running. Each system account in the terminal corresponds to one resource file, and the resource file is configured to store data needed to be used for running applications when the corresponding system account is logged in the system.

In an embodiment, the system account includes one main account and a plurality of child accounts. The system account ID may be an identification number of the system account. For example, the main account ID may be user0, the IDs of the plurality of child accounts may be user8, user10, user11, etc.

In step 202, it is determined whether the system account ID is a main account ID of the system, and step 203 is executed if the system account ID is not the main account ID.

The terminal determines whether the system account ID included in the foreground running request is the same as the main account ID. If the system account ID included in the foreground running request is not the same as the main account ID, the system account ID is not the main account ID, and step 203 is executed. If the system account ID included in the foreground running request is the same as the main account ID, the system account ID is the main account ID. Then, the terminal controls an application lock to read a resource file corresponding to the main account. The resource file corresponding to the main account includes an encryption instruction and an encryption algorithm corresponding to each application. Then, the terminal controls the application lock to search for the encryption instruction and the encryption algorithm corresponding to the application that generates the foreground running request in the resource file, and encrypts the application by using the encryption algorithm obtained by the searching if the encryption instruction obtained by the searching instructs to encrypt the application. The application lock is configured to encrypt the application installed in the terminal, and the application lock may only read the resource file corresponding to the main account. The encryption instruction is configured to instruct whether to encrypt the application. The encryption instruction may be a character such as 0 instructing not to encrypt the application or 1 instructing to encrypt the application. The encryption algorithm includes at least an encryption mode and an encryption password. The encryption mode may be a gesture-sliding mode, and accordingly the encryption password is a gesture-sliding pattern. Alternatively, the encryption mode may be a character-inputting mode, and accordingly the encryption password is a character string. Still alternatively, the encryption mode may be an audio-inputting mode, and accordingly the encryption password is an audio input. The encryption mode and the encryption algorithm are not limited in embodiments of the present disclosure.

The terminal controls the application lock to search for the encryption instruction and the encryption algorithm corresponding to the application that generates the foreground running request in the resource file as follows. The terminal acquires an application ID from the foreground running request, and obtains the encryption instruction and the encryption algorithm corresponding to the application ID according to a preset correspondence relationship between application IDs and encryption instructions as well as encryption algorithms. The application ID may be a package name of the application.

In step 203, the system account ID is replaced with the main account ID if the system account ID is not the main account ID, and step 206 is executed.

In an implementation, replacing the system account ID with the main account ID by the terminal includes: acquiring the system account ID included in the foreground running request by the terminal and modifying the system account ID to the main account ID by the terminal. In another implementation, replacing the system account ID with the main account ID by the terminal includes: deleting the system account ID included in the foreground running request by the terminal, and adding the main account ID into the foreground running request by the terminal. A method for replacing the system account ID with the main account ID is not limited in embodiments of the present disclosure.

For example, the main account ID is user0, and the system account ID included in the foreground running request is user8. When the terminal determines that user8 in the foreground running request is different from user0, the terminal replaces user8 in the foreground running request with user0.

In some embodiments, in order to improve security of the resource file corresponding to the main account, the terminal replaces the system account ID with the main account ID only if the system account ID included in the foreground running request is a double account ID. That is, after step 201 is executed, step 202 and step 203 are not executed, and, instead, step 204 is executed directly. The double account is one of the child accounts in the system. A double application running in the system with the double account logged in corresponds to an application running in the system with the main account logged in. An ID of the double application ID is the same as the ID of the application running in the system with the main account logged in and corresponding to the double application. The application account logged in the double application is different from the application account logged in the application running in the system with the main account logged in.

In step 204, it is determined whether the system account ID is a double account ID of the system.

The method for determining whether the system account ID is the double account ID of the system by the terminal is the same as the method for determining whether the system account ID is the main account ID by the terminal in step 202, which will not be elaborated herein.

For example, a double application qx sends a foreground running request, and the terminal acquires that a system account ID included in the foreground running request is user8. Then, the terminal determines whether user8 is the double account ID of the system.

In step 205, the system account ID is replaced with the main account ID if the system account ID is the double account ID.

As the terminal controls the application lock to read the resource file corresponding to the main account only if the system account ID included in the foreground running request is the main account ID, the terminal needs to replace the system account ID with the main account ID if the system account ID included in the foreground running request is the double account ID, so that the terminal may control the application lock to read the resource file corresponding to the main account. Otherwise, if the application running in a system with the child accounts other than the double account logged in sends the foreground running request, the terminal may not replace the system account ID included in the foreground running request with the main account ID, so that the terminal may not control the application lock to read the resource file corresponding to the main account. Thus, security of the resource file corresponding to the main account may be improved.

In step 206, it is determined whether to encrypt the application when the application is running in the system with the main account logged in.

Determining whether to encrypt the application when the application is running in the system with the main account logged in includes: reading the encryption instruction for the application; and determining that the application is to be encrypted when the application is running in the system with the main account logged in, if the encryption instruction instructs to encrypt the application.

The encryption instruction corresponding to each application ID is pre-stored in the resource file corresponding to the main account. The terminal may be informed whether it is required to encrypt the application when the terminal controls the application lock to read the encryption instruction corresponding to the application ID.

In step 207, if the application is to be encrypted when the application is running in the system with the main account logged in, the encryption algorithm for the application in the system with the main account logged in is determined, and the application is encrypted according to the encryption algorithm.

In step 208, a validating password inputted by the user is received.

In some embodiments, an encryption interface may be displayed after the terminal controls the application lock to encrypt the application according to the encryption algorithm. The validating password inputted in the encryption interface by the user may be received, and the application lock may be controlled to decrypt the application, such that the user is able to use the application.

In step 209, it is determined whether the validating password is correct according to the encryption algorithm, and step 210 is executed if the validating password is correct.

The terminal determines whether the validating password inputted by the user matches the encryption password included in the encryption algorithm. The validating password is determined as correct if the validating password matches the encryption password; and the validating password is determined as incorrect if the validating password does not match the encryption password.

If it is determined that the validating password is incorrect, the terminal does not control the application lock to decrypt the application. Alternatively, if it is determined that the validating password is incorrect, the terminal may display a prompt message for informing the user that the validating password is incorrect and another validating password needs to be inputted again.

In step 210, the application is decrypted if the validating password is correct.

The terminal controls the application lock to decrypt the application if the validating password is determined as correct, and in such a case, the user is able to use the application.

In step 211, the encryption instruction is modified to not encrypting the application from encrypting the application.

For example, the terminal modifies the encryption instruction from 1 to 0, indicating that the terminal does not encrypt the application.

Step 211 may be executed after or before step 210 is executed, or may be executed at the same time that step 210 is executed, which is not limited in embodiments of the present disclosure.

In step 212, it is determined whether the encryption instruction satisfies a preset updating condition, after the encryption instruction is modified. Step 213 is executed if the encryption instruction satisfies the preset updating condition.

The preset updating condition is that the application is switched to running in a background, or a running period of the application running in the background reaches a preset period, or a state of a screen of a terminal is converted to a lock state from a non-lock state. The preset updating condition may be set by the user or a developer, which is not limited in embodiments of the present disclosure. The lock state is the state that the screen is not lighted by the terminal, and the non-lock state is the state that the screen is lighted by the terminal.

When the preset updating condition is that the application is switched to running in the background, the terminal may be triggered to modify the encryption instruction if the application is switched to run in the background from the foreground. When the preset updating condition is that the running period of the application running in the background reaches the preset period, the terminal may be triggered to start a timer if the application is switched to run in the background from the foreground, and the terminal may modify the encryption instruction if the timer reaches the preset period. When the preset updating condition is that the state of the screen of the terminal is converted to the lock state from the non-lock state, the terminal may be triggered to modify the encryption instruction if the state of the screen of the terminal is converted to the lock state from the non-lock state.

In step 213, the encryption instruction is modified to encrypting the application from not encrypting the application, if the encryption instruction satisfies the updating condition.

The terminal modifies the encryption instruction to encrypting the application from not encrypting the application, such that when the application sends the foreground running request next time, the terminal is also able to control the application lock to encrypt the application. In addition, by requesting the user to input the validating password, and by allowing the user to use the application if the terminal determines that the validating password is correct, security of the application may be improved.

In conclusion, according to the method 200 provided by embodiments of the present disclosure, by replacing the system account ID included in the foreground running request sent by the application with the main account ID if the system account ID is not the main account ID, the application lock in the terminal may encrypt the application according to the encryption algorithm for the application in the system with the main account logged in. In such a manner, a problem that the application lock can only encrypt the application running in the system with the main account logged in, resulting in a narrow applying range of the application lock, may be solved. Thus, an effect of expanding the applying range of the application lock may be achieved.

Additionally, by determining whether the system account ID is the double account ID of the system, and replacing the system account ID with the main account ID if the system account ID is the double account ID, the terminal controls the application lock to read the resource file corresponding to the main account and to encrypt the application by using the encryption algorithm for the application in the resource file, only if the system account ID included in the foreground running request is the double account ID. Thus, security of the resource file corresponding to the main account may be improved.

Figure 3:
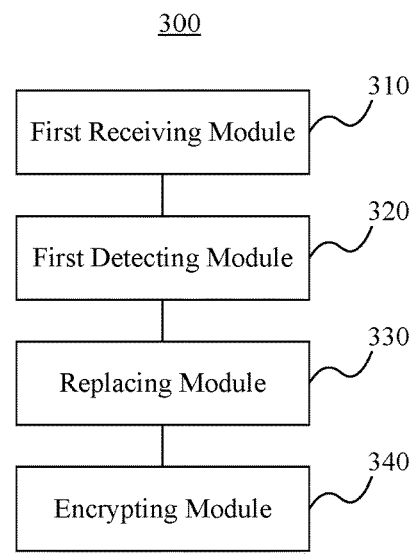
FIG. 3 illustrates a block diagram of a device for encrypting an application according to an exemplary embodiment.

FIG. 3 illustrates a block diagram of a device 300 for encrypting an application according to an exemplary embodiment. The device 300 is applied to a terminal, in which a plurality of system accounts may be set in the terminal. As shown in FIG. 3, the device 300 includes: a first receiving module 310, a first determining module 320, a replacing module 330, and an encrypting module 340.

The first receiving module 310 is configured to receive a foreground running request sent by the application, in which the foreground running request includes a system account ID of a system account currently logged in a system.

The first determining module 320 is configured to determine whether the system account ID acquired by the first receiving module 310 is a main account ID of the system.

The replacing module 330 is configured to replace the system account ID with the main account ID, if it is determined by the first determining module 320 that the system account ID is not the main account ID of the system.

The encrypting module 340 is configured to determine an encryption algorithm for the application in the system the main account acquired by the replacing module is logged in, and to encrypt the application according to the encryption algorithm.

In conclusion, according to the device 300 provided by embodiments of the present disclosure, by replacing the system account ID included in the foreground running request sent by the application with the main account ID, an application lock in the terminal may encrypt the application according to the encryption algorithm for the application in the system with the main account logged in. In this manner, a problem that the application lock can only encrypt the application running in the system with the main account logged in, resulting in a narrow applying range of the application lock, may be solved. Thus, an effect of expanding the applying range of the application lock may be achieved.

Figure 4:
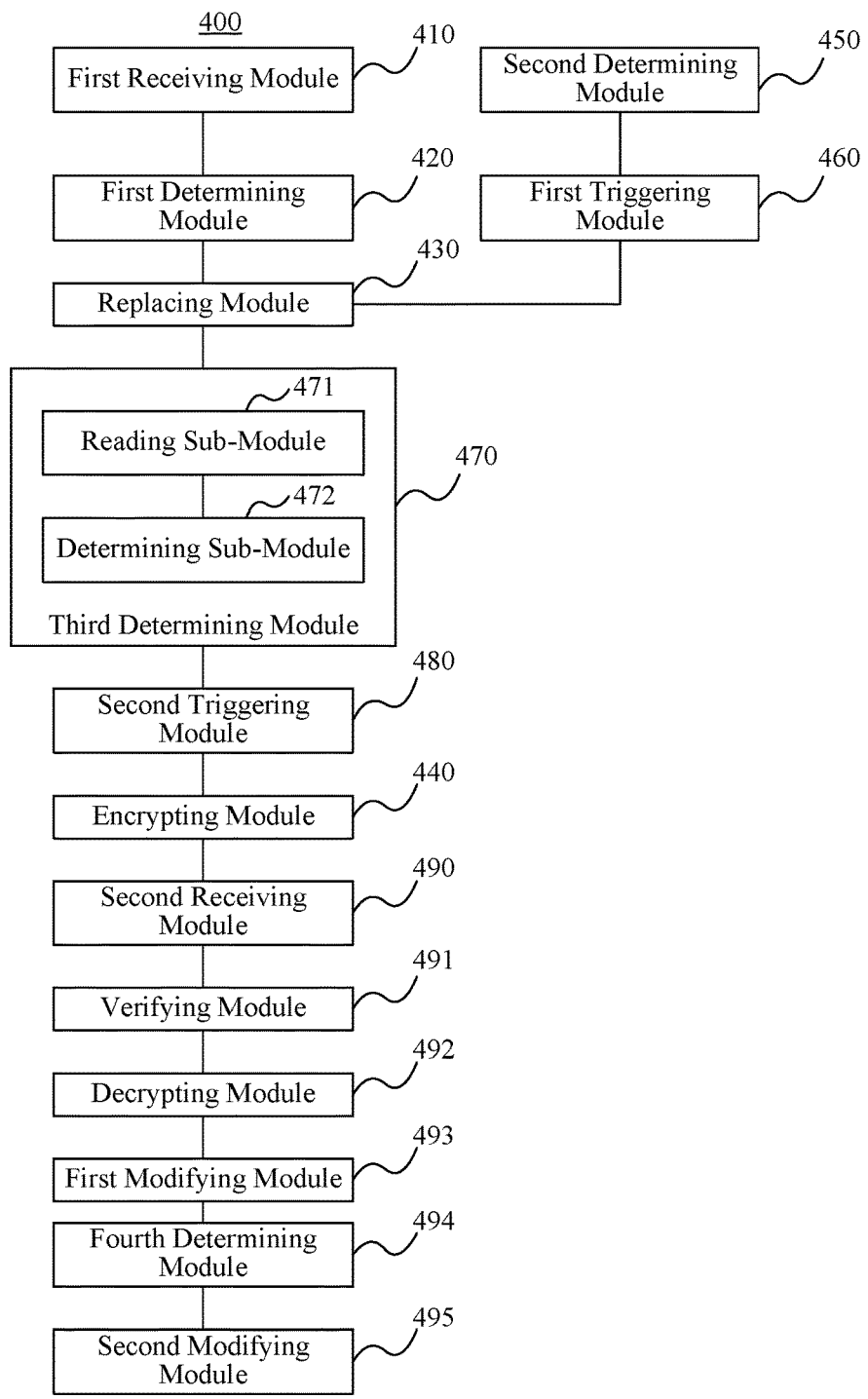
FIG. 4 illustrates a block diagram of a device for encrypting an application according to another exemplary embodiment.

FIG. 4 illustrates a block diagram of a device 400 for encrypting an application according to another exemplary embodiment. The device 400 is applied to a terminal, in which a plurality of system accounts may be set in the terminal. As shown in FIG. 4, the device 400 includes: a first receiving module 410, a first determining module 420, a replacing module 430, and an encrypting module 440.

The first receiving module 410 is configured to receive a foreground running request sent by the application, in which the foreground running request includes a system account ID of a system account currently logged in a system.

The first determining module 420 is configured to determine whether the system account ID acquired by the first receiving module 410 is a main account ID of the system.

The replacing module 430 is configured to replace the system account ID with the main account ID of the system, if it is determined by the first determining module 420 that the system account ID is not the main account ID of the system.

The encrypting module 440 is configured to determine an encryption algorithm for the application in the system with the main account acquired by the replacing module 430 logged in, and to encrypt the application according to the encryption algorithm.

Alternatively, the device 400 includes: a second determining module 450 and a first triggering module 460.

The second determining module 450 is configured to determine whether the system account ID is a double account ID of the system, in which an application account of the application running in the system with the double account logged in is different from the application account of the application running in the system with the main account logged in.

The first triggering module 460 is configured to trigger and execute replacing the system account ID with the main account ID if it is determined by the second determining sub-module 423 that the system account ID is the double account ID.

Alternatively, the device 400 further includes: a third determining module 470 and a second triggering module 480.

The third determining module 470 is configured to determine whether to encrypt the application when the application is running in the system with the main account logged in.

The second triggering module 480 is configured to determine the encryption algorithm for the application in the system with the main account logged in, if it is determined by the third determining module 470 that the application is to be encrypted when the application is running in the system with the main account logged in.

Alternatively, the third determining module 470 includes: a reading sub-module 471 and a determining sub-module 472.

The reading sub-module 471 is configured to read an encryption instruction for the application, in which the encryption instruction is configured to instruct whether to encrypt the application.

The determining sub-module 472 is configured to determine that the application is to be encrypted when the application is running in the system with the main account logged in, if the encryption instruction acquired by the reading sub-module 471 instructs to encrypt the application.

Alternatively, the device 400 further includes: a second receiving module 490, a verifying module 491, a decrypting module 492, and a first modifying module 493.

The second receiving module 490 is configured to receive a validating password inputted by a user.

The verifying module 491 is configured to determine whether the validating password received by the second receiving module 490 is correct according to the encryption algorithm.

The decrypting module 492 is configured to decrypt the application if it is determined by the verifying module 491 that the validating password is correct.

The first modifying module 493 is configured to modify the encryption instruction to not encrypting the application from encrypting the application.

Alternatively, the device 400 further includes: a fourth determining module 494 and a second modifying module 495.

The fourth determining module 494 is configured to determine whether the encryption instruction satisfies a preset updating condition, after the encryption instruction is modified.

The second modifying module 495 is configured to modify the encryption instruction to encrypting the application from not encrypting the application, if it is determined by the fourth determining module 494 that the encryption instruction satisfies the updating condition.

Alternatively, the preset updating condition is that the application is switched to running in a background, or a running period of the application running in the background reaches a preset period, or a state of a screen of a terminal is converted to a lock state from a non-lock state.

In conclusion, according to the device 400 provided by embodiments of the present disclosure, by replacing the system account ID included in the foreground running request sent by the application with the main account ID if the system account ID is not the main account ID, the application lock in the terminal may encrypt the application according to the encryption algorithm for the application in the system with the main account logged in. In such a manner, a problem that the application lock can only encrypt the application running in the system with the main account logged in, resulting in a narrow applying range of the application lock, may be solved. Thus, an effect of expanding the applying range of the application lock may be achieved.

In addition, by determining whether the system account ID is the double account ID of the system, and replacing the system account ID with the main account ID if the system account ID is the double account ID, the terminal controls the application lock to read the resource file corresponding to the main account and to encrypt the application by using the encryption algorithm for the application in the resource file, only if the system account ID included in the foreground running request is the double account ID. Thus, security of the resource file corresponding to the main account may be improved.

Regarding the device 400 in this embodiment, the specific ways of implementing operations by each module have been illustrated in the method embodiments, which will not be further elaborated herein.

An exemplary embodiment of the present disclosure provides an apparatus for encrypting an application, which can realize the methods provided by embodiments of the present disclosure. The apparatus for encrypting an application includes a processor and a memory configured to store instructions executable by the processor. The processor is configured to: receive a foreground running request sent by the application, wherein the foreground running request includes a system account ID of a system account currently logged in a system; determine whether the system account ID is a main account ID of the system; replace the system account ID with the main account ID of the system if the system account ID is not the main account ID of the system; and determine an encryption algorithm for the application in the system with the main account logged in, and encrypt the application according to the encryption algorithm.

Figure 5:
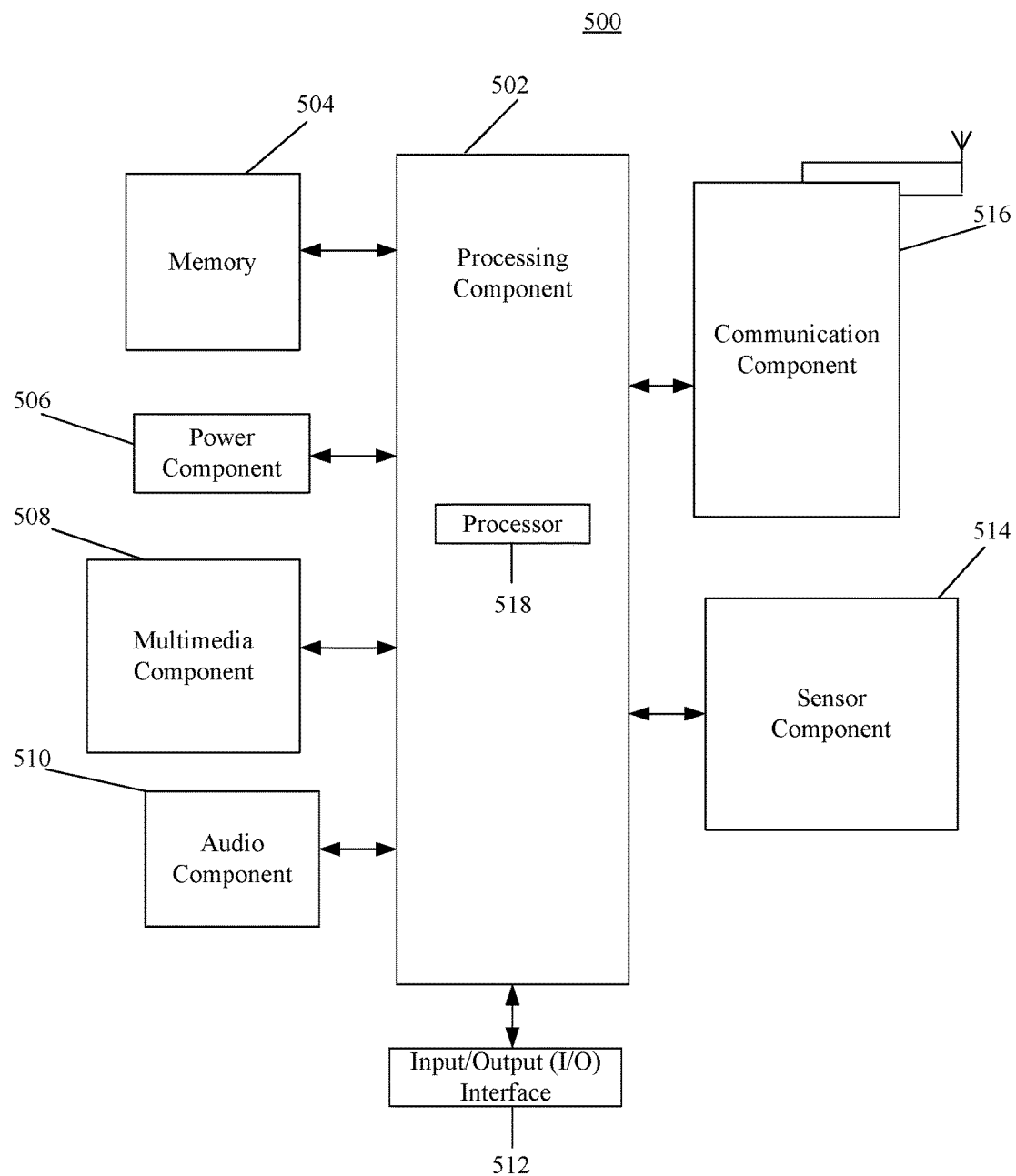
FIG. 5 illustrates a block diagram of an apparatus for encrypting an application according to an exemplary embodiment.

FIG. 5 illustrates a block diagram of an apparatus 500 for encrypting an application according to an exemplary embodiment. For example, the apparatus 500 may be a mobile phone, a computer, a digital broadcasting terminal, a message sending and receiving equipment, a game controller, a tablet device, a medical device, a fitness equipment, a personal digital assistant or the like.

Referring to FIG. 5, the apparatus 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the apparatus 500, such as the operations associated with display, telephone calls, data communications, camera operations, and recording operations. The processing component 502 may include one or more processors 518 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the apparatus 500. Examples of such data include instructions for any applications or methods operated on the apparatus 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the apparatus 500. The power component 506 may include a power management system, one or more power sources, and any other components associated with the generation, management, and distribution of power in the apparatus 500.

The multimedia component 508 includes a screen providing an output interface between the apparatus 500 and the user. In some embodiments, the screen may include a liquid crystal display and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and the rear camera may receive an external multimedia datum while the apparatus 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone configured to receive an external audio signal when the apparatus 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the apparatus 500. For instance, the sensor component 514 may detect an open/closed status of the apparatus 500, relative positioning of components, e.g., the display and the keypad, of the apparatus 500, a change in position of the apparatus 500 or a component of the apparatus 500, a presence or absence of user contact with the apparatus 500, an orientation or an acceleration/deceleration of the apparatus 500, and a change in temperature of the apparatus 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the apparatus 500 and other devices. The apparatus 500 can access a wireless network based on a communication standard, such as WiFi, 2G, 3G, or 4G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 504, executable by the processor 518 in the apparatus 500, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and embodiments be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing form the scope thereof. It is intended that the scope of the invention only be limited by the appended claims.

What is claimed is:

1. A method for encrypting an application, comprising:
   receiving a foreground running request sent by the application, wherein the foreground running request comprises a system account ID of a system account currently logged in a system;
   determining whether the system account ID is a main account ID of the system, wherein a plurality of system accounts are set for the system, the plurality of system accounts comprise a plurality of child accounts and a main account, the main account ID is an ID of the main account, a resource file corresponding to the main account comprises an encryption instruction and an encryption algorithm corresponding to each application;
   replacing the system account ID with the main account ID of the system if the system account ID is not the main account ID of the system;
   determining an encryption algorithm for the application in the system with the main account logged in, and encrypting the application according to the encryption algorithm;
   determining whether the system account ID is a double account ID of the system, wherein an application account of the application running in the system with a double account logged in is different from the application account of the application running in the system with the main account logged in, and
   triggering and executing replacing the system account ID with the main account ID if the system account ID is the double account ID.

2. The method according to claim 1, further comprising:
   determining whether to encrypt the application when the application is running in the system with the main account logged in; and
   determining the encryption algorithm for the application in the system with the main account logged in if the application is to be encrypted when the application is running in the system with the main account logged in.

3. The method according to claim 2, wherein determining whether to encrypt the application when the application is running in the system with the main account logged in comprises:
   reading an encryption instruction for the application, wherein the encryption instruction is configured to instruct whether to encrypt the application; and
   determining that the application is to be encrypted when the application is running in the system with the main account logged in, if the encryption instruction instructs to encrypt the application.

4. The method according to claim 1, further comprising:
   receiving a validating password inputted by a user;
   determining whether the validating password is correct according to the encryption algorithm;
   decrypting the application if the validating password is correct; and
   modifying the encryption instruction to not encrypting the application from encrypting the application.

5. The method according to claim 4, further comprising:
determining whether the encryption instruction satisfies a preset updating condition, after the encryption instruction is modified; and
modifying the encryption instruction to encrypting the application from not encrypting the application, if the encryption instruction satisfies the updating condition.

6. The method according to claim 5, wherein the preset updating condition is that the application is switched to running in a background, or a running period of the application running in the background reaches a preset period, or a state of a screen of a terminal is converted to a lock state from a non-lock state.

7. An apparatus for encrypting an application, comprising:
a processor; and
a memory configured to store instructions executable by the processor;
wherein the processor is configured to:
receive a foreground running request sent by the application, wherein the foreground running request comprises a system account ID of a system account currently logged in a system;
determine whether the system account ID is a main account ID of the system, wherein a plurality of system accounts are set for the system, the plurality of system accounts comprise a plurality of child accounts and a main account, the main account ID is an ID of the main account, a resource file corresponding to the main account comprises an encryption instruction and an encryption algorithm corresponding to each application;
replace the system account ID with the main account ID of the system if the system account ID is not the main account ID of the system;
determine an encryption algorithm for the application in the system with the main account logged in, and encrypt the application according to the encryption algorithm;
determine whether the system account ID is a double account ID of the system, wherein an application account of the application running in the system with a double account logged in is different from the application account of the application running in the system with the main account logged in; and
trigger replacing the system account ID with the main account ID if the system account ID is the double account ID.

8. The apparatus according to claim 7, wherein the processor is further configured to:
determine whether to encrypt the application when the application is running in the system with the main account logged in; and
determine the encryption algorithm for the application in the system with the main account logged in if the application is to be encrypted when the application is running in the system with the main account logged in.

9. The apparatus according to claim 8, wherein the processor is further configured to:
read an encryption instruction for the application, wherein the encryption instruction is configured to instruct whether to encrypt the application; and
determine that the application is to be encrypted when the application is running in the system with the main account logged in, if the encryption instruction instructs to encrypt the application.

10. The apparatus according to claim 7, wherein the processor is further configured to:
receive a validating password inputted by a user;
determine whether the validating password is correct according to the encryption algorithm;
decrypt the application if the validating password is correct; and
modify the encryption instruction to not encrypting the application from encrypting the application.

11. The apparatus according to claim 10, wherein the processor is further configured to:
determine whether the encryption instruction satisfies a preset updating condition, after the encryption instruction is modified; and
modify the encryption instruction to encrypting the application from not encrypting the application, if the encryption instruction satisfies the updating condition.

12. The apparatus according to claim 11, wherein the preset updating condition is that the application is switched to running in a background, or a running period of the application running in the background reaches a preset period, or a state of a screen of a terminal is converted to a lock state from a non-lock state.

13. A non-transitory computer-readable storage medium having stored therein instructions that, when executed by a processor of a terminal, cause the terminal to perform a method for encrypting an application, the method comprising:
receiving a foreground running request sent by the application, wherein the foreground running request comprises a system account ID of a system account currently logged in a system;
determining whether the system account ID is a main account ID of the system, wherein a plurality of system accounts are set for the system, the plurality of system accounts comprise a plurality of child accounts and a main account, the main account ID is an ID of the main account, a resource file corresponding to the main account comprises an encryption instruction and an encryption algorithm corresponding to each application;
replacing the system account ID with the main account ID of the system if the system account ID is not the main account ID of the system;
determining an encryption algorithm for the application in the system with the main account logged in, and encrypting the application according to the encryption algorithm;
determining whether the system account ID is a double account ID of the system, wherein an application account of the application running in the system with a double account logged in is different from the application account of the application running in the system with the main account logged in, and
triggering and executing replacing the system account ID with the main account ID if the system account ID is the double account ID.

* * * * *